(12) United States Patent
Gluszyk

(10) Patent No.: US 11,567,194 B1
(45) Date of Patent: Jan. 31, 2023

(54) SONAR TRANSDUCER SYSTEM AND METHOD OF PROCESSING DATA

(71) Applicant: Jozef J Gluszyk, Houston, TX (US)

(72) Inventor: Jozef J Gluszyk, Houston, TX (US)

(*) Notice: Subject to any disclaimer, the term of this patent is extended or adjusted under 35 U.S.C. 154(b) by 0 days.

(21) Appl. No.: 17/194,178

(22) Filed: Mar. 5, 2021

Related U.S. Application Data

(60) Provisional application No. 62/985,414, filed on Mar. 5, 2020.

(51) Int. Cl.
  *G01S 15/10* (2006.01)
  *G01S 7/56* (2006.01)
  *G01S 7/526* (2006.01)

(52) U.S. Cl.
  CPC ............ *G01S 15/101* (2013.01); *G01S 7/526* (2013.01); *G01S 7/56* (2013.01)

(58) Field of Classification Search
  CPC ........... G01S 15/101; G01S 7/526; G01S 7/56

USPC .......................................................... 367/99
See application file for complete search history.

(56) References Cited

U.S. PATENT DOCUMENTS

| 5,263,371 A | * | 11/1993 | Maresca, Jr. | ........ G01F 23/2962 181/124 |
| 8,630,814 B2 | * | 1/2014 | Cheng | ..................... G01F 23/02 702/55 |
| 2021/0309548 A1 | * | 10/2021 | Lindemann | ............. C02F 3/006 |

* cited by examiner

*Primary Examiner* — Daniel L Murphy
(74) *Attorney, Agent, or Firm* — Nick A Nichols, Jr.

(57) ABSTRACT

In a sonar-based transducer system, single or multiple transducers may collect and transmit data to a management module for analysis to optimize and/or control a process. Secondary sensors may provide additional product data for analysis. Historical data may be stored in a data library for future reference. Real time data may be transmitted to a control center via a virtual dashboard.

10 Claims, 6 Drawing Sheets

SONAR TRANSDUCER SYSTEM AND METHOD OF PROCESSING DATA

CROSS-REFERENCE TO RELATED APPLICATION

This application claims priority to and the benefit of the filing date of U.S. Provisional Application Ser. No. 62/985,414, filed Mar. 5, 2020, which application is herein incorporated by reference in its entirety.

BACKGROUND

The present invention relates generally to industrial interface measurement apparatus, and more particularly to measurement apparatus and method using one or more sonar transducers and optional secondary instrumentation/sensors to acquire data for process control and optimization.

It is commonly known in the art that a transducer may be used to determine the distance of an object through the placement of a detector which senses when the emitted acoustic wave has reached the detector. Based on the time it takes the acoustic wave to reach the detector as well as the speed of the acoustic wave within the transmission medium, the distance from the source of the wave to the detector may be calculated. It is also known that the level of a liquid within a storage container may be determined by the concept of echo ranging. For example, U.S. Pat. No. 3,834,233 to Willis et al. discloses such a system. The system includes an ultrasonic transducer mounted at the top of a storage tank which directs an acoustic wave through the air down into a storage tank toward the surface of the liquid to be measured. Once the acoustic wave reaches the surface of the liquid, the wave's frequency is such that it will be reflected back toward the device which is equipped with a receiver to detect the reflected wave. The receiver thus detects the echo from the surface of the liquid and, based on the time for the signal to reach the surface of the liquid and return, calculates the distance from the transducer to the surface of the liquid.

However, such systems are not without their problems. Because such systems typically transmit the acoustic wave through a gaseous medium above the surface of the liquid to be measured, lower operating frequencies are required in order that the transmitted wave will be reflected at the liquid surface. These lower operating frequencies are less accurate in making distance measurements than higher frequencies. Such prior art systems have also been plagued by false signals received at the detector which did not originate from the device (such as outside noise) or which were not reflected from the material surface (i.e., reflected from the sides of the storage container). Prior art systems have also been plagued by the harsh conditions typically found within many industrial storage containers, particularly those storing corrosive substances. The quality of the device operation and the length of time these prior art detectors maintain operation in such harsh environments result in their frequent malfunction and necessary replacement.

Such prior art systems have been adversely affected by excessive dispersion of the emitted ultrasonic measurement beam such that the emitted signal is not strong enough to be reflected back to the device from a great distance (i.e., when the material in the storage container is at a low level). A weak emitted signal may also be caused by poor signal transfer within the device. Another cause of poor device performance occurs when the detector radiates the transmitted signal in a number of directions, rather than in a narrow, focused beam, thereby increasing the possibility of falsely detecting reflected waves (e.g., from the storage container walls). The prior art has employed a variety of damping materials in various configurations to try and alleviate some of these problems. For example, U.S. Pat. No. 5,121,628, issued to Merkl et al. employs one such damping approach using lead pellets. For better signal transfer, the prior art has also used bonding agents such as epoxies or solder, as disclosed in U.S. Pat. No. 4,000,650, issued to Snyder.

Conventional control systems and instrumentation generally provide single signals that are combined with other instrument signals and processed in an exterior programmable logic controller (PLC) control system, distributed control system (DCS) or other control system. Within these control systems, limited logic control and calculations may be performed. Similarly, individual signals from these control systems may be transmitted to computer software to perform more sophisticated analysis.

SUMMARY

In a sonar-based transducer system, single or multiple transducers may collect and transmit data to a management module for analysis to optimize and/or control a process. Secondary sensors may provide additional product data for analysis. Historical data may be stored in a data library for future reference. Real time data may be transmitted to a control center via a virtual dashboard.

It is an object of this invention to provide a sonar transducer system and method to identify and decode sonar signal signatures that may be used to optimize system performance and/or control.

It is another object of the present invention to provide a sonar transducer system which may measure liquid level, liquid/liquid interface and liquid/solid interface.

It is still another object of the present invention to provide a sonar transducer system which may include multiple transduces.

It is yet another object of the present invention to provide a sonar transducer system and process module that may process sonar signal signatures and other data output to a dashboard.

It is still another object of the present invention to provide a management module for process optimization and control.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION

A sonar-based system including single or multiple sonar transducers may be capable of acquiring data from a base sonar device(s) and other instrumentation. In addition, data may be acquired from other instruments within a third-party process unit. A management module may be capable of processing data and identifying sonar signal signatures or fingerprints that may be used as a primary component in process optimization and control systems. The management module may eliminate layers of conventional control system systems to provide high value output directly to an operator via a dashboard. The management module may transmit real time data analysis to the dashboard, allow insight into future process conditions and may provide tools to optimize or control a process.

Raw sonar data from the transducer(s) may be collected and processed in a separate management module. Data from the sonar probe system and signals from secondary or redundant instrumentation may be transmitted to the management module. The management module software may process the data, perform data analysis, forecast future trends, perform diagnostics and output the information via a virtual dashboard to a facility control system, DCS, PLC or other output device. The management module output may be used to optimize the performance or control of a process or a vessel. The management module may store historical data. Overflow data gathered by the system may be stored in an optional data logger for future use by the management module or output for analysis.

The management module output may be presented to a facility operator via a virtual dashboard depicting the real time process control of the system. The dashboard may provide process status, instrument health diagnostics and indicate past/future process trend(s). The management module may have access to a library of past events previously analyzed and found to have a predictable outcome. These sonar signatures or fingerprints may be decoded and provide the status of the process and may be used to predict future anomalies in the process. This information may be conveyed to an operator via the dashboard. Additionally, sonar signatures may be used to validate critical process status in a format allowing for autonomous control.

Figure 1:
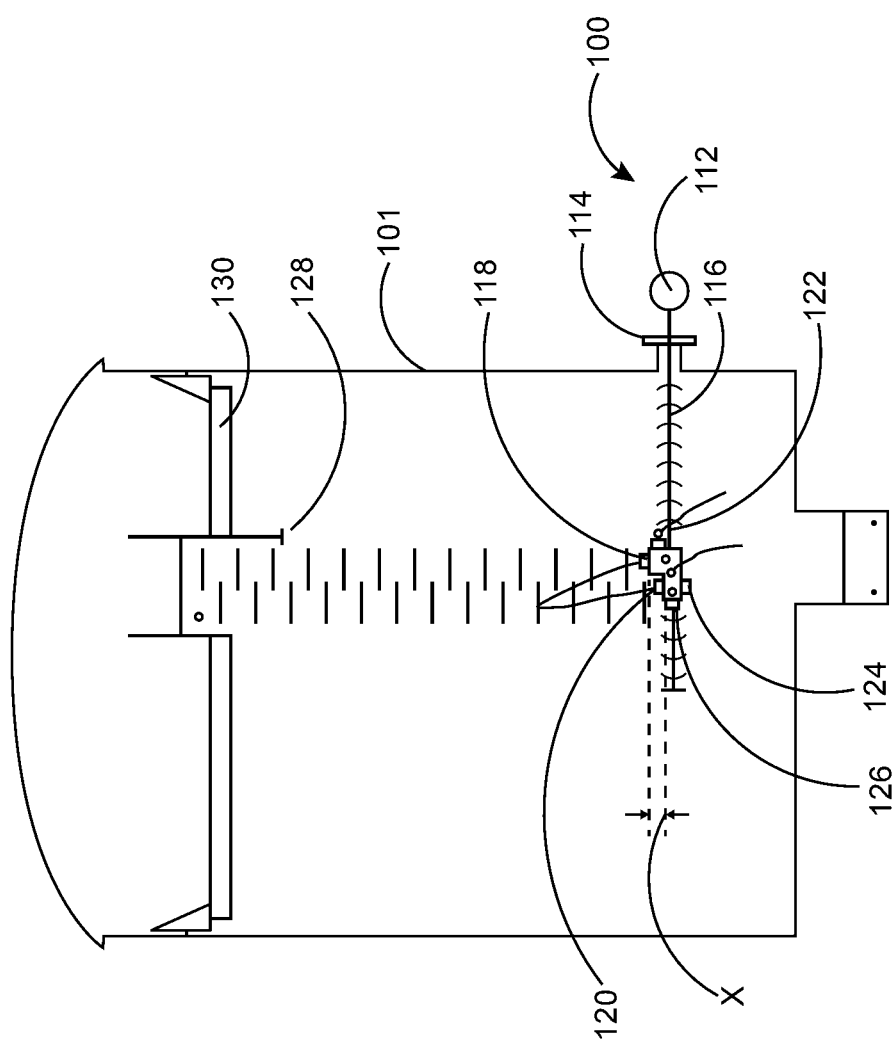
FIG. 1 is a sketch illustrating the installation of a sonar system within a container.

Referring first to FIG. 1, a sonar transducer system may include a sonar transducer apparatus generally identified by the reference numeral 100. The transducer apparatus 100 may include an electronic housing 112, a tank connector 114, a shaft 116 and two or more transducers mounted on the shaft 116. The transducer apparatus 100 may be removably secured to a vessel or tank 101 so that the shaft 116 extends into the interior of the tank 101. By way of illustration but without limitation, the tank 101 may be a tank in a refinery process where crude oil is input into the process and various petrochemical products are the output of the process. Process data that may be monitored and stored may be used to optimize the process. The transducer apparatus 100 may be used to collect data throughout the process, such as but not by way of limitation, temperature, pressure, liquid levels and interfaces.

In the configuration shown in FIG. 1, the transducer apparatus 100 may include a first transducer 118 and a second transducer 120, both oriented facing upward relative to the horizontal orientation of the shaft 116. The first and second transducers 118, 120 may be offset from one another. The first transducer 118 may be offset from the shaft 116 a distance greater than the second transducer 120. That is, there is an offset distance X of the first transducer 118 relative to the second transducer 120.

The transducer apparatus 100 may include additional transducers, for example but without limitation, transducers 122, 124, 126 may be oriented to generate signals in vertical and/or horizontal directions. Two or more transducers offset in reference to each other may generate signals that may be received by anther transducer. The first transducer 118 may, for example but without limitation, generate a signal received by the second transducer 120. The known offset distance X may be used to compensate for changes in the speed of sound caused by product stratification and temperature gradients within the product in the tank 101.

The transducer apparatus 100 may self-calibrate by bouncing a sonar signal from a target back to a transducer, such as but without limitation, transducers 118, 120, 122, 124, 126, to calibrate itself for property changes in the liquid within the tank 101. For example, a sonar signal from transducer 118 may be bounced off a target 128 that is attached to a floating roof 130. The internal structures of the tank 101 may also be utilized as targets for self-calibrating the transducer apparatus 100. Devices may likewise be installed in the tank 101 in strategic locations so that self-calibration of the transducer apparatus 100 may be achieved. For example, the floating roof 130 may include legs that may be approximately 4 feet long. A sonar signal may be bounced off the floating roof 130 and its legs. Data received from both the floating roof 130 and the floating roof leg(s) may provide calibration data allowing the sonar transducer apparatus 100 to achieve greater measurement accuracy of the total liquid level in the tank 101.

By utilizing multiple transducers and additional sensors for pressure and/or temperature data, a more accurate calibration of the fluid level measurements may be achieved. In addition, unique data specific to the fluid in the tank 101, such as density, evaporation losses and other properties, may be collected that may provide useful information.

A single transducer driven by different frequencies may identify fluid properties. Lower frequencies travel in dirty liquid better than higher frequencies. Such data gathering may be useful and may derive useful information for further development of the sonar transducer apparatus 100. In addition, having a multi frequency system may be used for measurement of a greater variety of liquid properties.

The transducer apparatus 100 may generate sufficient data to provide specific product temperature profiles, including critical zones desired in applications where evaporation losses and emissions are involved.

Figure 2:
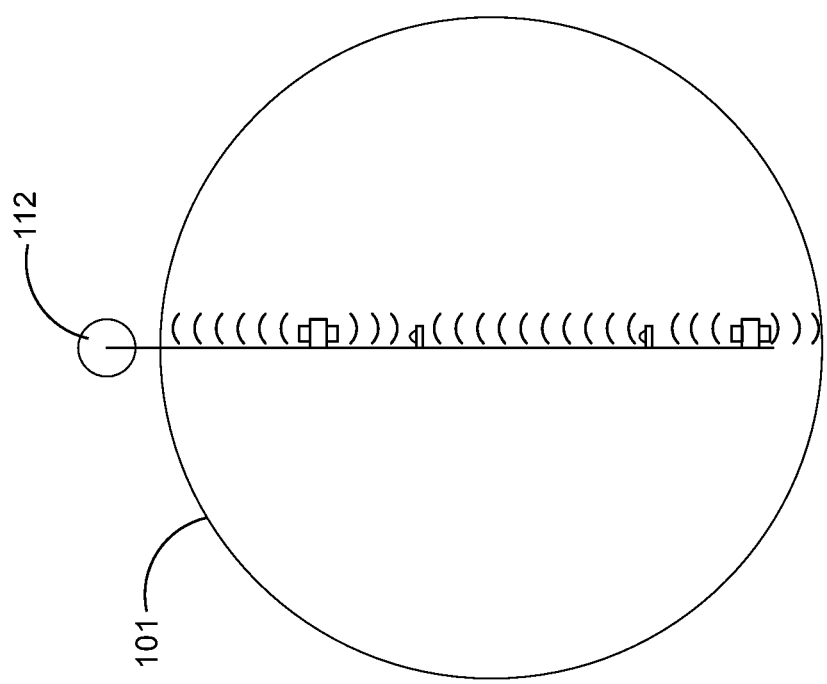
FIG. 2 is a sketch of a top view illustrating a sonar system within a container.
Figure 3:
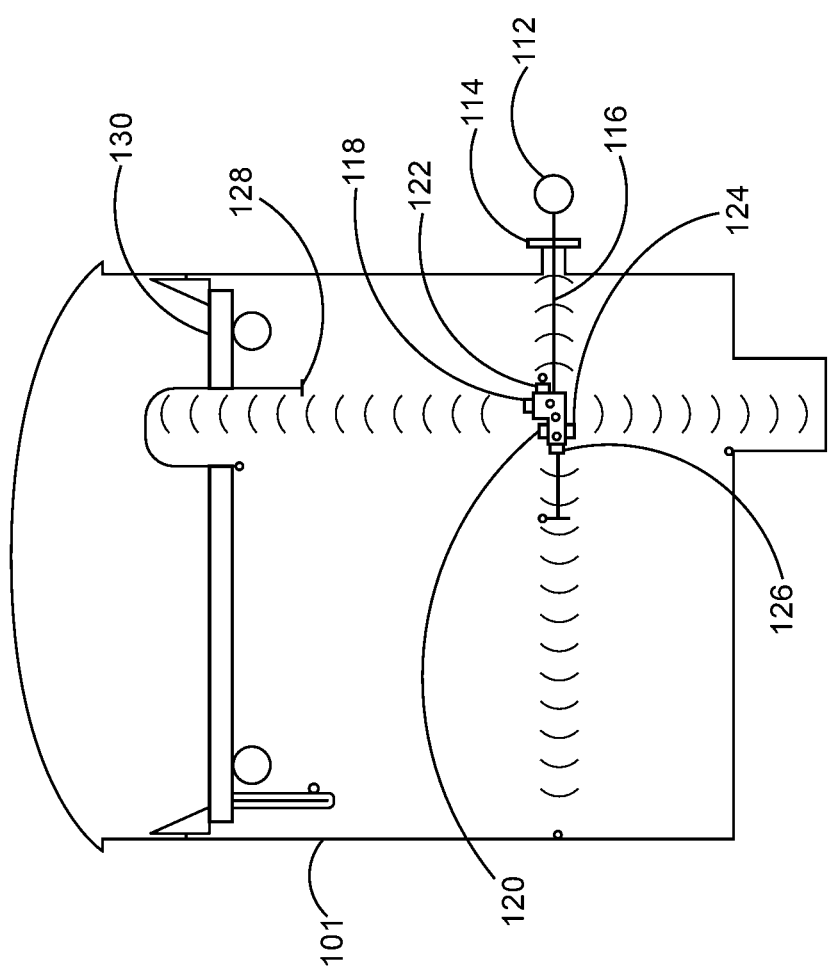
FIG. 3 is a sketch of a section view illustrating a sonar system within a container having a floating roof.
Figure 4:
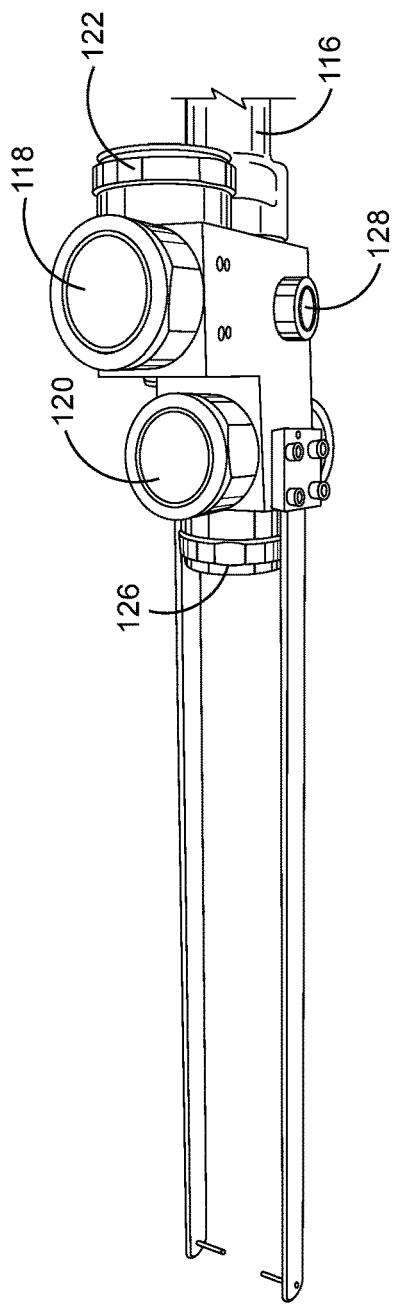
FIG. 4 is a perspective view of a self-calibrating sonar transducer.
Figure 6:
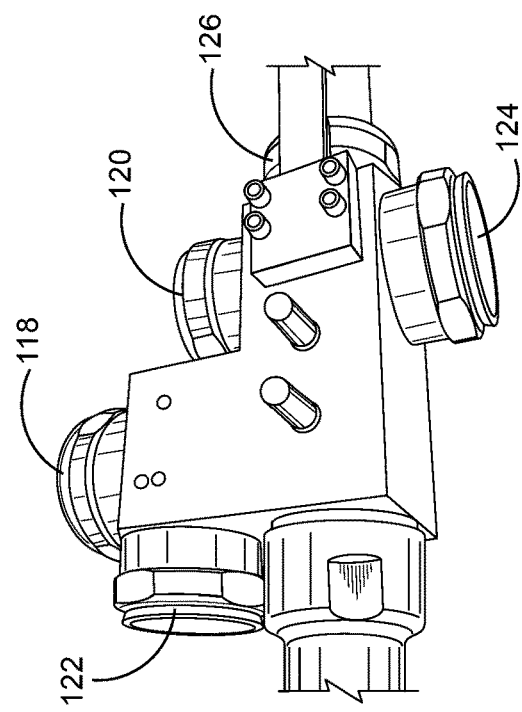
FIG. 6 is another enlarged partial perspective view of the sonar transducer shown in FIG. 4.
Figure 5:
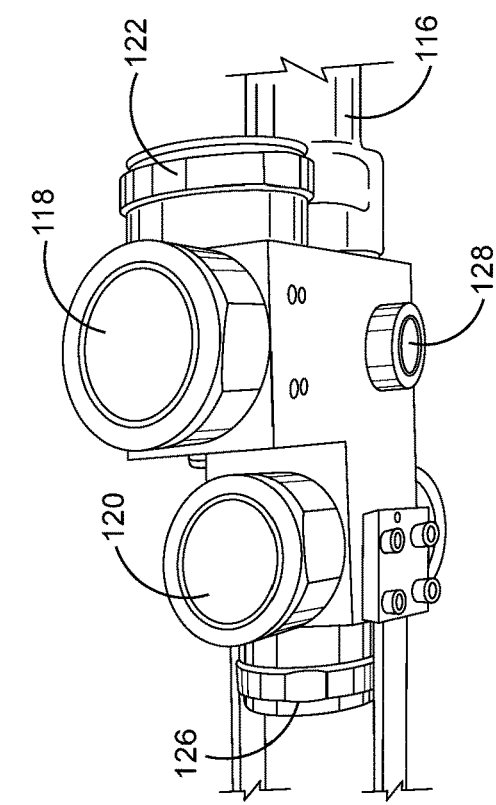
FIG. 5 is an enlarged partial perspective view of the sonar transducer shown in FIG. 4.

Multiple transducers with or without offsets may be located over the horizontal length of the shaft 116, shown in FIG. 2, allowing the transducer apparatus 100 to coordinate fluid measurements and provide accurate measurements of temperature profiles, stratification, and density.

A transducer-based sonar system may be utilized to measure the position of the floating roof 130, tank leak detection and product loss from emissions. This may be achieved without removing the tank 101 from service. Leak detection and product loss from emissions measurements may be translated to all storage tanks.

The transducer apparatus 100 may include transducer(s) facing vertically up (transducers 118, 120) to measure liquid levels and transducer(s) facing vertically down (transducer 126) to measure fluid interface and/or distance. Such a sonar transducer device may be constructed in a vertical (inserted from top of the vessel 101) or horizontal configuration (inserted from side of the vessel 101).

Figure 7:
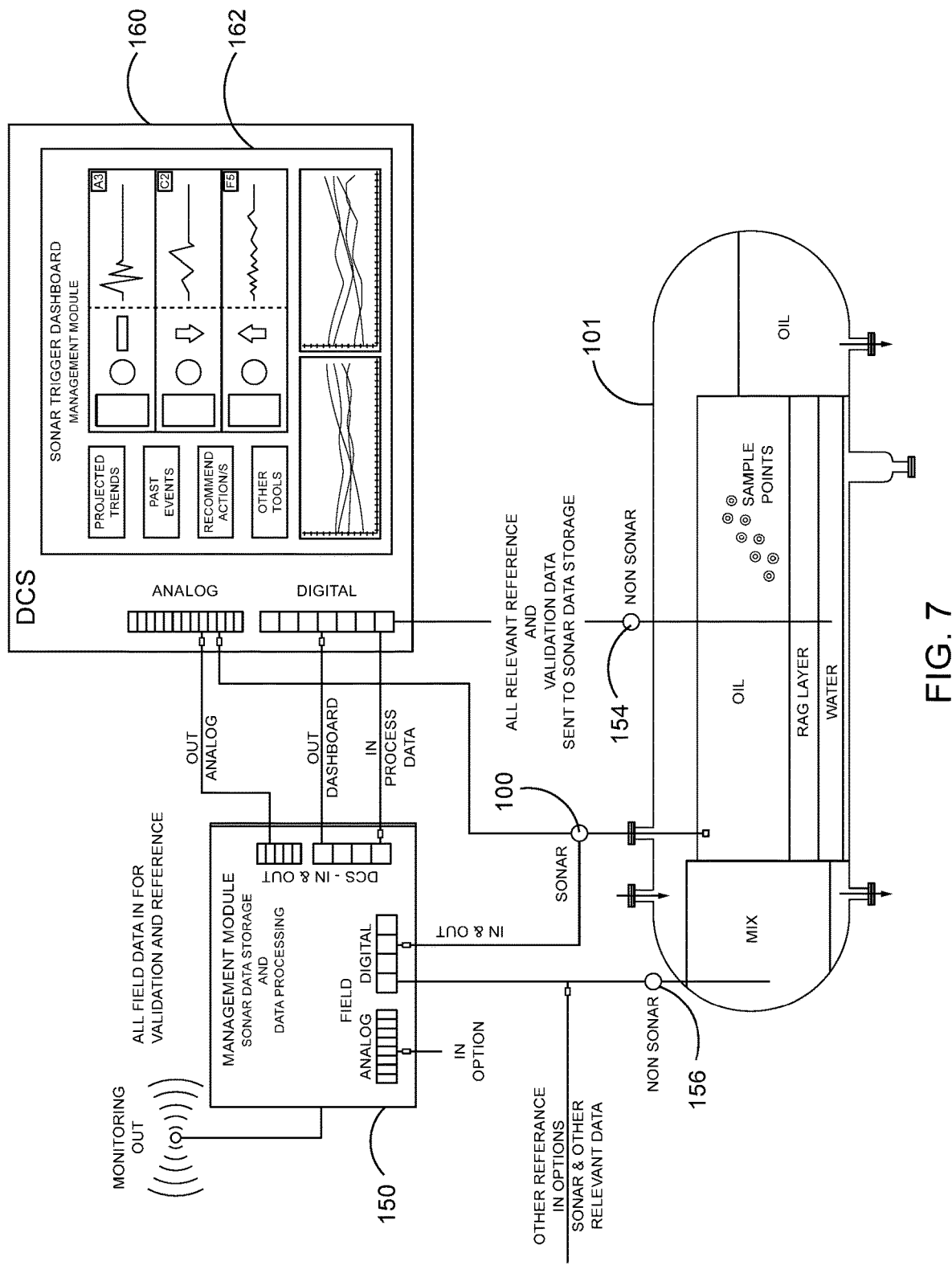
FIG. 7 is a schematic diagram depicting the collection and processing of data in a refinery process.
Figure 8:
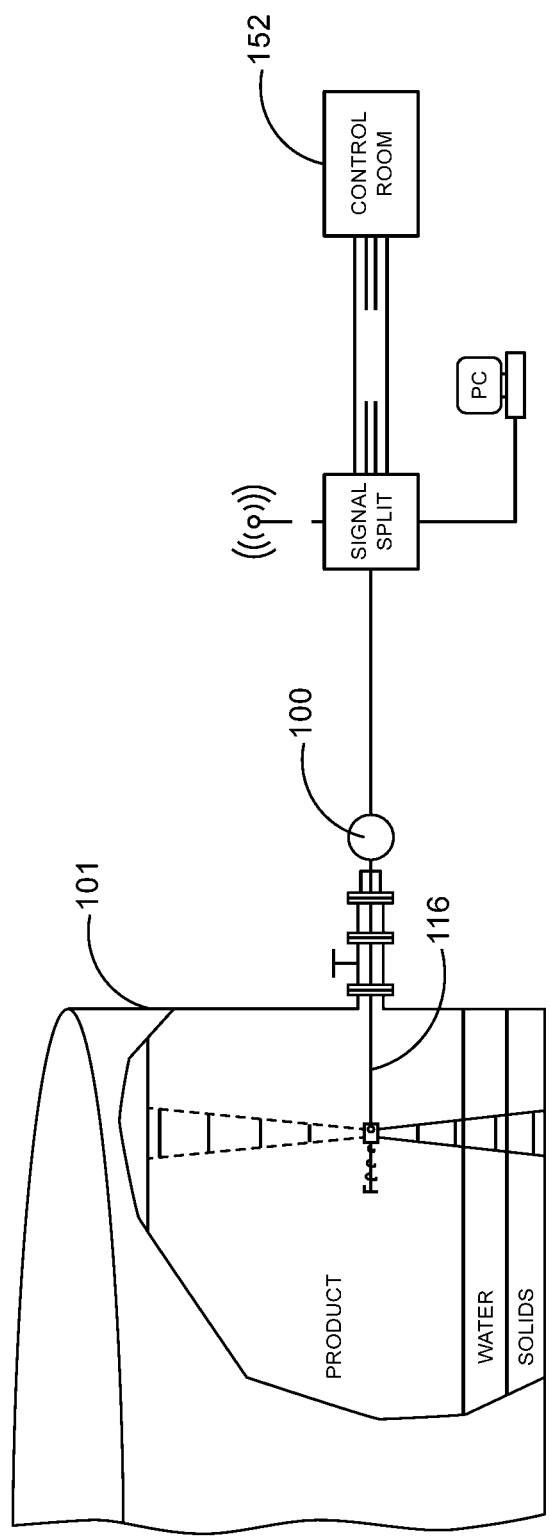
FIG. 8 is a schematic diagram depicting the collection and transmission of product data from a tank to a control center.

Referring now to FIGS. 7 and 8, schematic diagrams, for purposes of illustration but without limitation, depict the collection and processing of data from tank 101 in a refinery process. The sonar transducer apparatus 100 may include multiple sonar transducers secured to the shaft 116, some of them offset from one another, that perform calibrations and gather liquid level and interface data for the product in the tank 101. A signal may be generated by one transducer and received by one or more transducers that are offset by a known distance, to calibrate and/or identify fluid properties. One or more temperature and pressure sensors may be located along the shaft 116 to provide detailed process data that may be combined with the offset transducer data to accurately measure the speed of the signal in the fluid. Accuracy of the measurement may be improved by validation (i.e., a physical property change). Besides accurate level and interface measurement of the fluid, the data collected may be used to calculate additional process properties and parameters such as density, evaporation losses and other properties.

In addition to the property signals produced by the transducer apparatus 100, raw sonar data from the multiple transducers may be collected and processed in a management module 150 to provide additional information relating to the refinery process. Raw data may normally be processed in the electronics of the transducer apparatus 100 to provide a clean output to a control system 152, illustrated in FIG. 8. Raw data has an inherent value and may be collected, analyzed and used to obtain additional process information. This unique and distinct data provides repeatable data signatures/fingerprints that precisely reflect the process status that may be decoded or stored. This data may be stored and used for a variety of process analysis that include, but is not limited to, past process events and unique trends that may predict future events.

Digital data from the transducer apparatus 100 may be send to the management module 150 where software processes the data. The resulting output provides tools for process optimization and control. The management module 150 may access a library of previously gathered historical data signatures, compare current data against these signatures and identify leading indicators used to forecast future trends. Forecasted future trends by sonar signals may be substantiated against other process data to include, but not limited to, signals from secondary sensors 154, 156 secured to the tank 101. The data from the secondary sensors 154, 156 and any overflow data from the transducer apparatus 100 may be stored in a data logger that may be accessed by the management module 150. The stored signals could include, but are not limited to, flow, level, temperature, interface, data from other sonar devices and pressure in equipment or piping of the refinery process. Other data from site control systems 160 such as DCS, PLC, wired or wireless, may be directly transmitted to the management module 150.

The management module 150 may employ control system logic, machine learning algorithm and proprietary software to perform in-depth analysis of a process. As such the management module 150 controls, analyzes, performs process diagnostics and uses data signatures to predict future trends in the operation of the refinery process. The management module output may be conveyed to the operator via a virtual dashboard 162 or be made available via the internet for remote analysis. The dashboard provides real time data and predicted trends to the operator including but not limited to level, interface, temperature, pressure and density. The dashboard may provide a wide range of information useful for instrument health, diagnostics, status of the process, future process trends and other pertinent information.

While a preferred embodiment of the invention has been shown and described, other and further embodiments of the invention may be devised without departing from the basic scope thereof, and the scope thereof is determined by the claims which follow.

The invention claimed is:

1. A sonar transducer apparatus for detecting the fluid/fluid and fluid/solid interfaces in a vessel, comprising:
    a) an elongated shaft removably connected to a vessel, said shaft extending into said vessel;
    b) a plurality of sonar transducers supported on said shaft, said plurality of sonar transducers configured to generate signals in vertical and/or horizontal directions, wherein said plurality of sonar transducers include a first sonar transducer and a second sonar transducer, said first sonar transducer offset from said shaft a greater distance than said second sonar transducer; and
    c) an electronics enclosure fixedly secured to a distal end of said shaft, said enclosure housing data transmitters and receivers for collecting and transmitting fluid data.

2. The sonar transducer apparatus of claim 1 wherein said first and second sonar transducers face upward for generating sonar signals in vertical directions.

3. The sonar transducer apparatus of claim 1 further including temperature and pressure sensors.

4. The sonar transducer apparatus of claim 1 wherein at least one of said plurality of sonar transducers is driven by different frequencies.

5. The sonar transducer apparatus of claim 1 wherein said plurality of sonar transducers include forward facing transducers and rearward facing transducers for generating sonar signals in horizontal directions.

6. A method of collecting and processing data for process control and optimization, comprising the steps of:
    a) obtaining sonar signal signature data of a product contained in a vessel;
    b) transmitting said sonar signal signature data to a data management module;
    c) analyzing said sonar signal signature data; and
    d) conveying output from said data management module to a control center operator via a virtual dashboard.

7. The method of claim 6 further including performing process diagnostics using said sonar signal signature data to predict process trends.

8. The method of claim 6 further including the step of collecting raw sonar data and storing said raw sonar data in a historical library file.

9. The method of claim 8 further including the step of comparing said sonar signal signature data to data in said historical library file to predict process trends.

10. The method of claim 6 further including the step of obtaining and storing signal data from secondary sensors collecting product data.

* * * * *